(12) United States Patent
Chen (10) Patent No.: US 7,063,392 B2
(45) Date of Patent: Jun. 20, 2006

(54) WHEEL RIM WITH A CONNECTING WALL HAVING THREE ARCHED WALL PORTIONS

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 0 days.

(21) Appl. No.: 10/856,548

(22) Filed: May 28, 2004

(65) Prior Publication Data

US 2005/0264093 A1 Dec. 1, 2005

(51) Int. Cl.
*B60B 25/00* (2006.01)
*B60B 21/06* (2006.01)

(52) U.S. Cl. .................................. 301/95.108; 301/58

(58) Field of Classification Search ................ 301/55, 301/58, 95.101, 95.104, 95.107, 95.108, 301/104; 29/894.33, 894.331, 894.332, 894.35
See application file for complete search history.

(56) References Cited

U.S. PATENT DOCUMENTS

| | | | |
|---|---|---|---|
| 5,499,864 A * | 3/1996 | Klein et al. ............. | 301/95.104 |
| 5,651,591 A * | 7/1997 | Mercat et al. ........... | 301/95.108 |
| 6,024,413 A * | 2/2000 | Dixon et al. ............. | 301/58 |
| 6,089,672 A * | 7/2000 | Chen ........................ | 301/58 |
| 6,155,651 A * | 12/2000 | Mizata et al. ........... | 601/95.104 |
| 6,257,677 B1 | 7/2001 | Chen | |
| 6,293,629 B1 * | 9/2001 | Chen ........................ | 301/58 |
| 6,367,883 B1 * | 4/2002 | Chen ........................ | 301/55 |
| 6,502,906 B1 * | 1/2003 | Chen ........................ | 301/58 |

* cited by examiner

*Primary Examiner*—Jason R. Bellinger
(74) *Attorney, Agent, or Firm*—Frommer Lawrence & Haug LLP; Ronald R. Santucci (57) ABSTRACT

A wheel rim includes two annular sidewalls and a main connecting wall. The main connecting wall has two ends connected respectively and fixedly to radial inner ends of the sidewalls, and opposite radially inner and outer surfaces. The radially inner surface faces the hub, and has two axial surface portions and a middle surface portion that are preferably concaved toward the tire. The radially outer surface has two axial surface portions and a middle portion. The axial surface portions of the radially inner and outer surfaces define two force-bearing areas having a plurality of mounting holes. The middle surface portions of the radially inner and outer surfaces define a weight-reducing area having a thickness smaller than a thickness of the force-bearing areas. The force-bearing areas and the weight-reducing area are arched.

8 Claims, 8 Drawing Sheets

WHEEL RIM WITH A CONNECTING WALL HAVING THREE ARCHED WALL PORTIONS

BACKGROUND OF THE INVENTION

1. Field of the Invention

This invention relates to a wheel rim, and more particularly to a lightweight wheel rim used for a bicycle, wheelbarrow, and other such transportation or carrying apparatus.

2. Description of the Related Art

Figure 1:
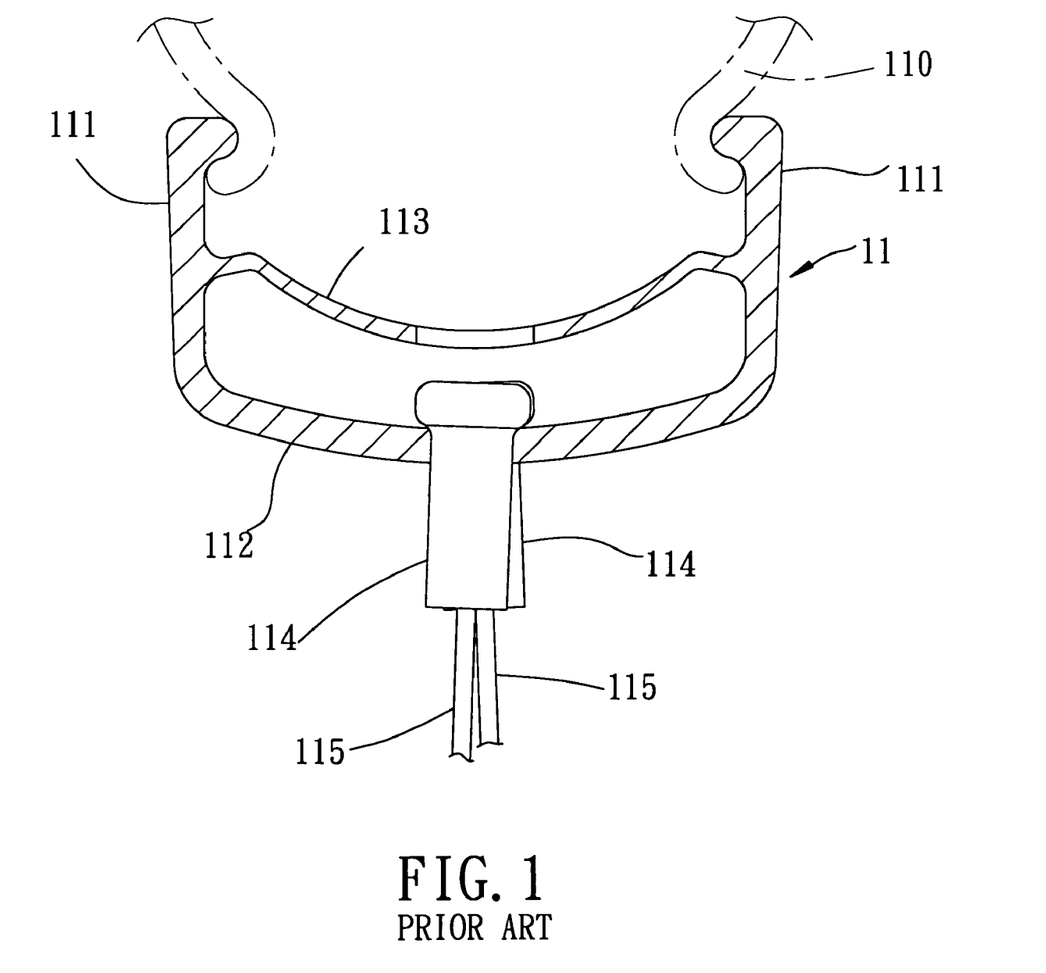
FIG. 1 is a sectional view of a conventional wheel rim.

Referring to FIG. 1, a conventional wheel rim 11 is shown to include two spaced-apart annular sidewalls 111 disposed at two opposite sides of a tire 110, an inner connecting wall 112 interconnecting radial inner ends of the sidewalls 111, and an outer connecting wall 113 interconnecting intermediate portions of the sidewalls 111 and spaced apart from the inner connecting wall 112. During assembly, a plurality of locking heads 114 are inserted through a middle portion of the inner connecting wall 112 to engage respectively and threadably radial outer ends of a plurality of spokes 115 so as to fix the wheel rim 11 to a hub (not shown). However, this causes stress to be concentrated at the middle portion of the inner connecting wall 112.

Figure 2:
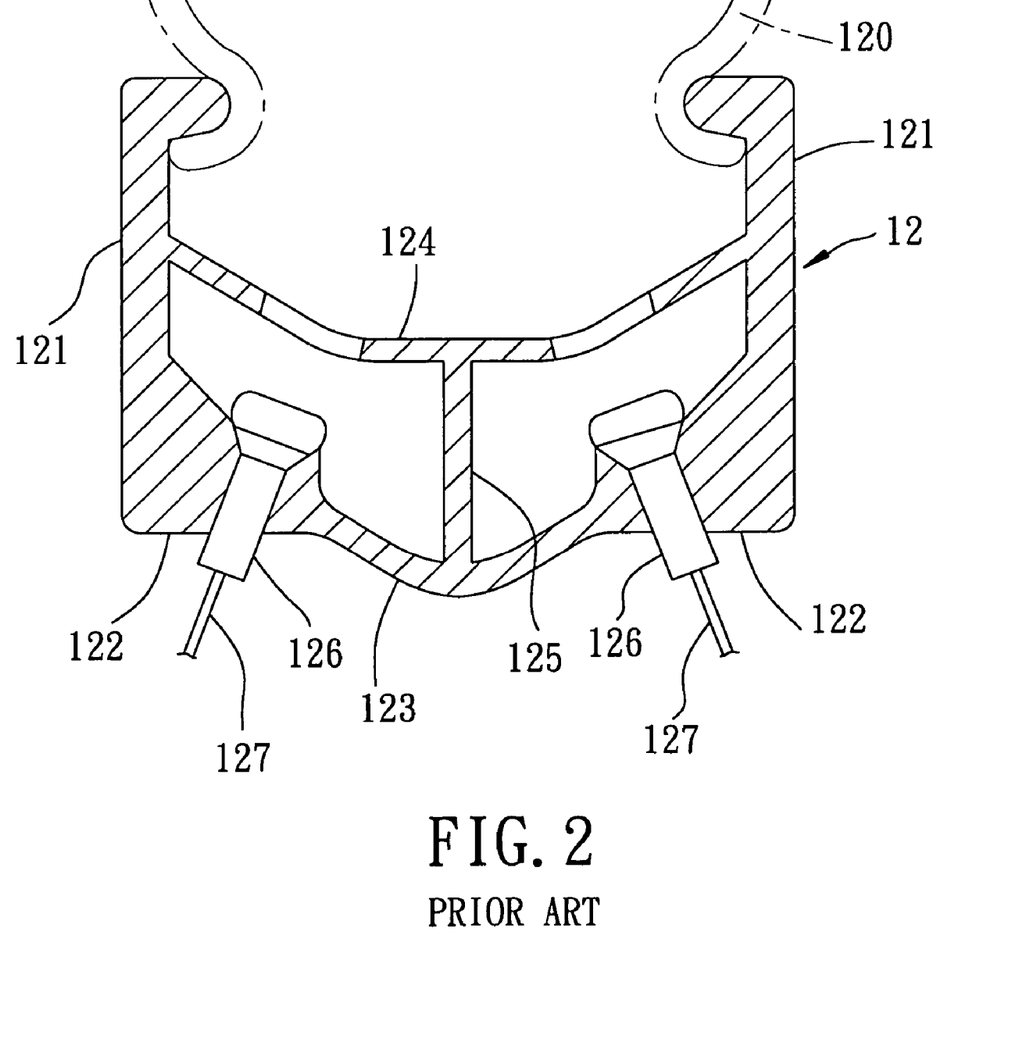
FIG. 2 is a sectional view of another conventional wheel rim.

U.S. Pat. No. 6,257,677 discloses an improved wheel rim so as to solve the stress concentration problem. Referring to FIG. 2, the improved wheel rim 12 is shown to include two sidewalls 121 disposed at two opposite sides of a tire 120, two spoke-mounting seats 122 disposed respectively at radial inner ends of the sidewalls 121, a curved inner connecting wall 123 interconnecting the spoke-mounting seats 122, an outer connecting wall 124 interconnecting the sidewalls 121 and adjacent to the tire 120, and a radially extending reinforcing wall 125 interconnecting the inner and outer connecting walls 123, 124. A plurality of locking heads 126 extend through the spoke-mounting seats 122, and engage respectively and threadably a plurality of spokes 127. The spoke-mounting seats 122 are thicker than the sidewalls 121 and the inner connecting wall 123. As such, stress concentration at the inner connecting wall 123 can be prevented. However, the spoke-mounting seats 122 are heavy and therefore increase the total weight of the wheel rim 12.

SUMMARY OF THE INVENTION

The object of this invention is to provide a wheel rim that includes a connecting wall, which is constructed so as to prevent stress concentration thereat and which is relatively thin so as to significantly reduce the total weight of the wheel rim.

According to this invention, a wheel rim includes two annular sidewalls and a main connecting wall. The main connecting wall has two ends connected respectively and fixedly to radial inner ends of the sidewalls, and opposite radially inner and outer surfaces. The radially inner surface faces the hub, and has two axial surface portions and a middle surface portion that are preferably concaved toward the tire. The radially outer surface has two axial surface portions and a middle portion. The axial surface portions of the radially inner and outer surfaces define two force-bearing areas having a plurality of mounting holes. The middle surface portions of the radially inner and outer surfaces define a weight-reducing area having a thickness smaller than a thickness of the force-bearing areas. The force-bearing areas and the weight-reducing area are arched.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 3:
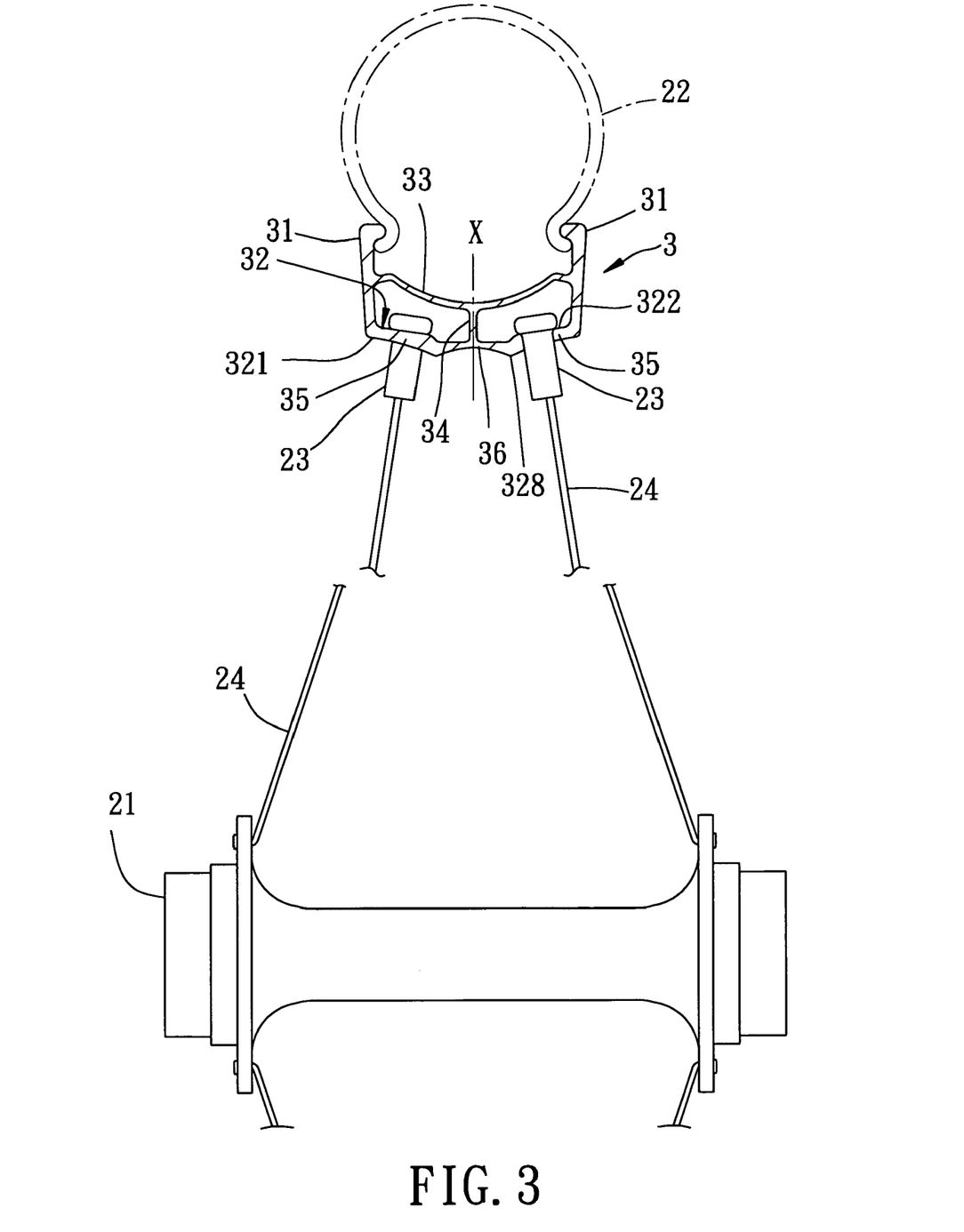
FIG. 3 is a sectional view of the first preferred embodiment of a wheel rim according to this invention, illustrating how the wheel rim is connected to a hub.
Figure 4:
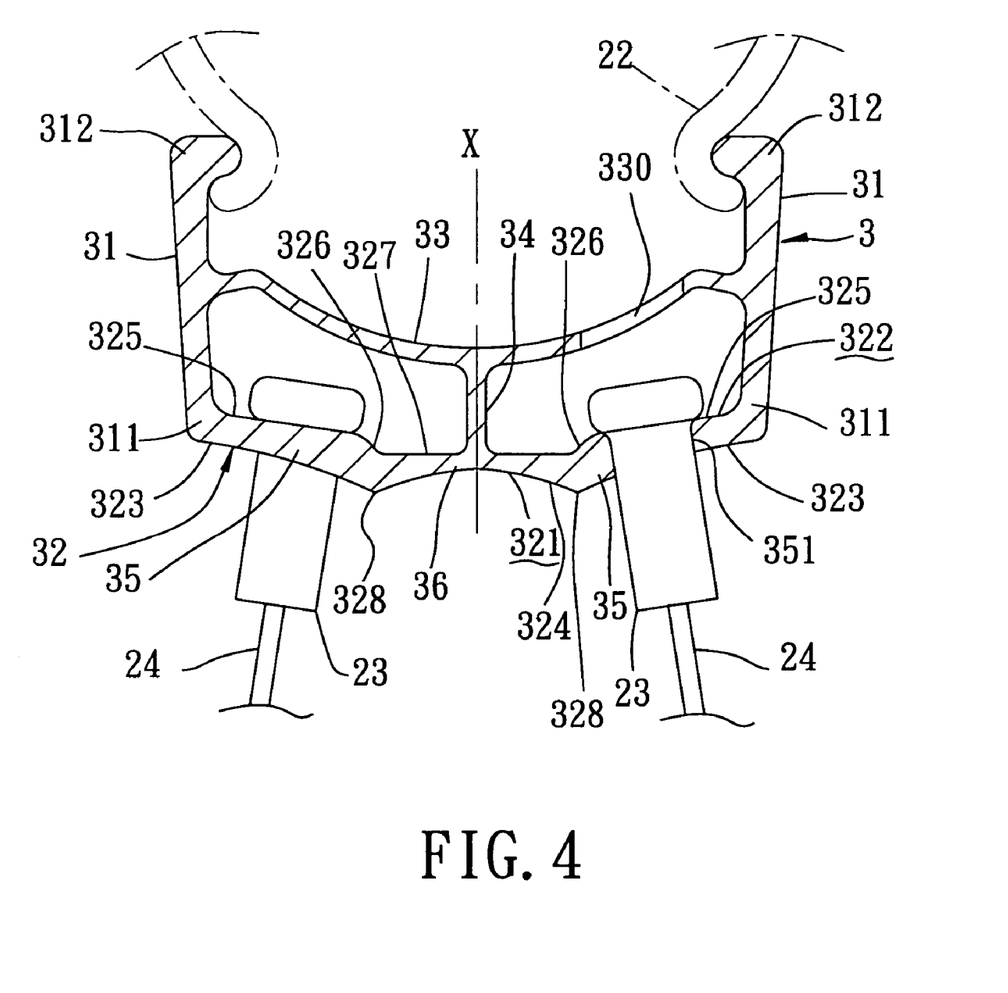
FIG. 4 is an enlarged sectional view of the first preferred embodiment.
Figure 5:
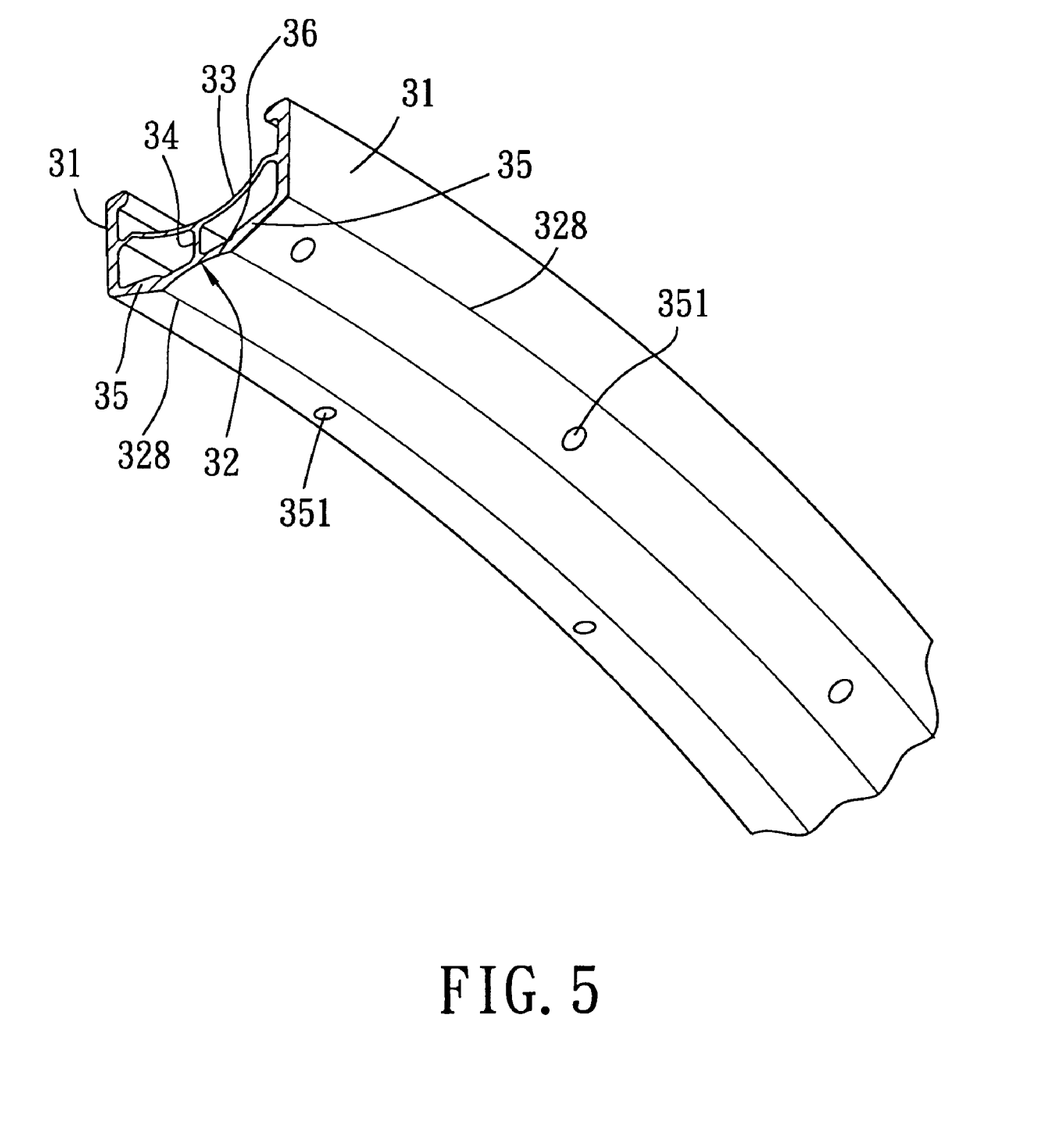
FIG. 5 is a fragmentary perspective view of the first preferred embodiment.

Referring to FIGS. 3, 4, and 5, the first preferred embodiment of a wheel rim 3 according to this invention is shown to include two annular sidewalls 31, a main connecting wall 32, an auxiliary connecting wall 33, and a reinforcing wall 34. The wheel rim 3 is disposed around and is connected fixedly to a hub 21 by a plurality of locking heads 23 and a plurality of spokes 24. A tire 22 is sleeved on the wheel rim 3.

The sidewalls 31 are symmetrical relative to a radially extending middle plane (X). Each of the sidewalls 31 has a radial inner end 311 distal from the tire 22, and a radial outer end 312 proximate to the tire 22.

The main connecting wall 32 is disposed around the hub 21, and has radially inner and outer surfaces 321, 322.

The radially inner surface 321 faces the hub 21, and has two axial surface portions 323 extending respectively from the radial inner ends 311 of the sidewalls 31 toward the middle plane (X) and concaved toward the tire 22, and a middle surface portion 324 interconnecting the axial surface portions 323 and concaved toward the tire 22 to define a sharp ridge 328 at a junction between the middle surface portion 324 and each of the axial surface portions 323.

The radially outer surface 322 is opposite to the radially inner surface 321, faces the tire 22, and has two axial surface portions 325 extending respectively from the sidewalls 311 toward the middle plane (X), two concaved surface portions 326 extending respectively from the axial surface portions 325 toward the middle plane (X) and concaved toward the hub 21, and a middle surface portion 327 interconnecting the concaved surface portions 326.

The axial surface portions 323, 325 of the radially inner and outer surfaces 321, 322 define two force-bearing areas 35 that are formed with a plurality of mounting holes 351 (see FIG. 5). The locking heads 23 extend respectively through the mounting holes 351 in the force-bearing areas 35. The middle surface portions 324, 327 of the radially inner and outer surfaces 321, 322 define a weight-reducing area 36 that is disposed between the force-bearing areas 35 and that has a thickness smaller than a thickness of the force-bearing areas 35. Each of the force-bearing areas 35 and the weight-reducing area 36 is arched so that the main connecting wall 32 consists of three successive arched wall portions, thereby strengthening the main connecting wall 32. The thickness of each of the force-bearing areas 35 increases gradually in a direction toward the middle plane (X). As such, most of the pulling force exerted by the spokes 24 is distributed along the sharp ridges 328.

The auxiliary connecting wall 33 has two opposite sides that are formed respectively and integrally with intermediate portions of the sidewalls 31, and a plurality of holes 330 that are formed through the auxiliary connecting wall 33 and that are aligned respectively with the mounting holes 351 in the main connecting wall 32. During assembly, the locking heads 23 can be inserted respectively into the mounting holes 351 in the main connecting wall 32 through the holes 330 in the auxiliary connecting wall 33.

The reinforcing wall 34 extends along a radial direction of the hub 21, and has a radial inner end formed integrally with the main connecting wall 32, and a radial outer end formed integrally with the auxiliary connecting wall 33.

Figure 6:
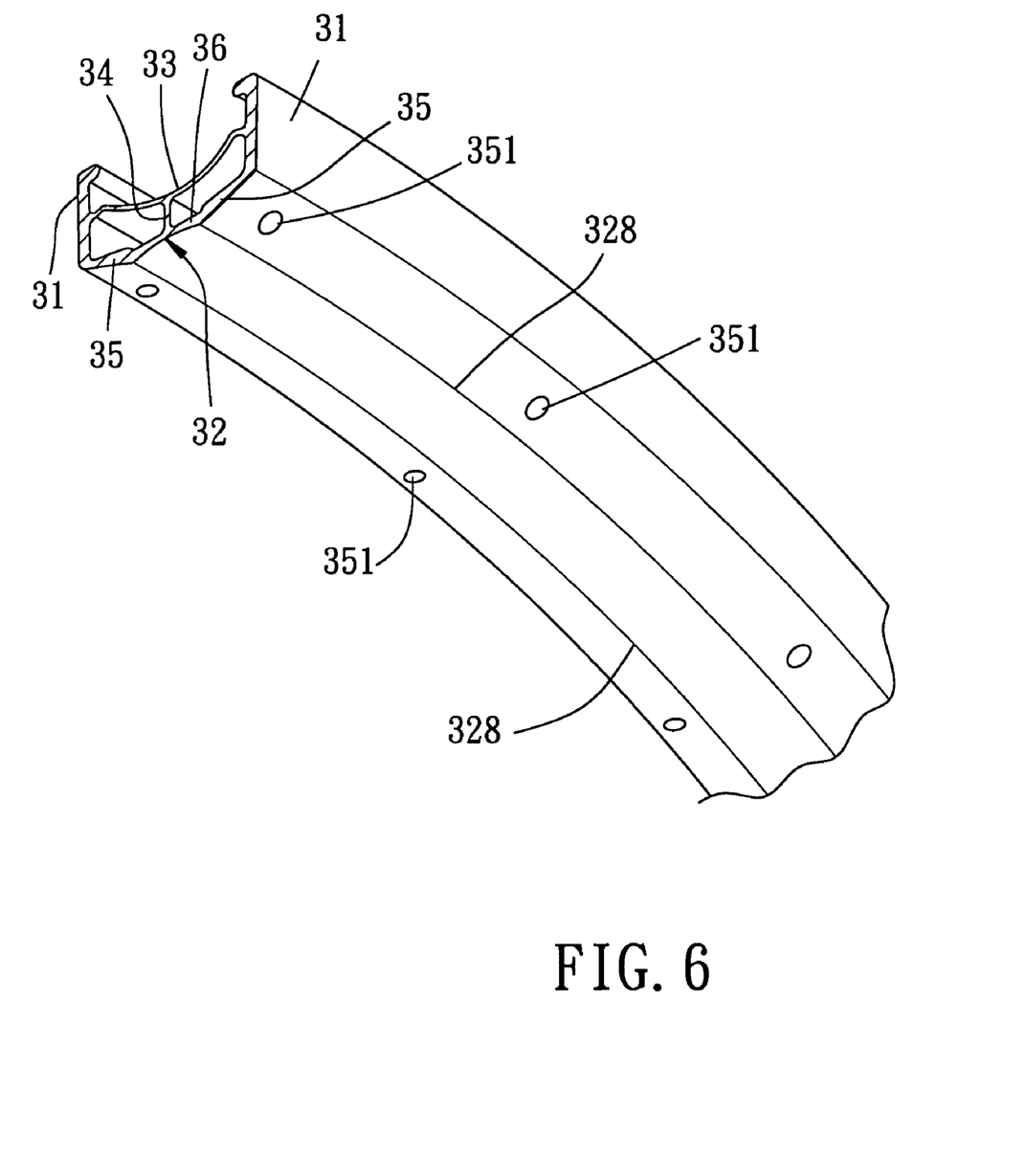
FIG. 6 is a fragmentary perspective view of the second preferred embodiment of a wheel rim according to this invention.

Each of the mounting holes 351 in the left force-bearing area 35 of the main connecting wall 32 is disposed between two adjacent ones of the mounting holes 351 in the right force-bearing area 35 of the main connecting wall 32 along a circumferential direction of the hub 21 and the wheel rim 3. This arrangement of the mounting holes 351 can be modified. For example, the mounting holes 351 in the left force-bearing area 35 of the main connecting wall 32 may be aligned respectively with the mounting holes 351 in the right force-bearing area 35 of the main connecting wall 32 along the circumferential direction of the hub 21 and the wheel rim 3, as shown in FIG. 6.

Figure 7:
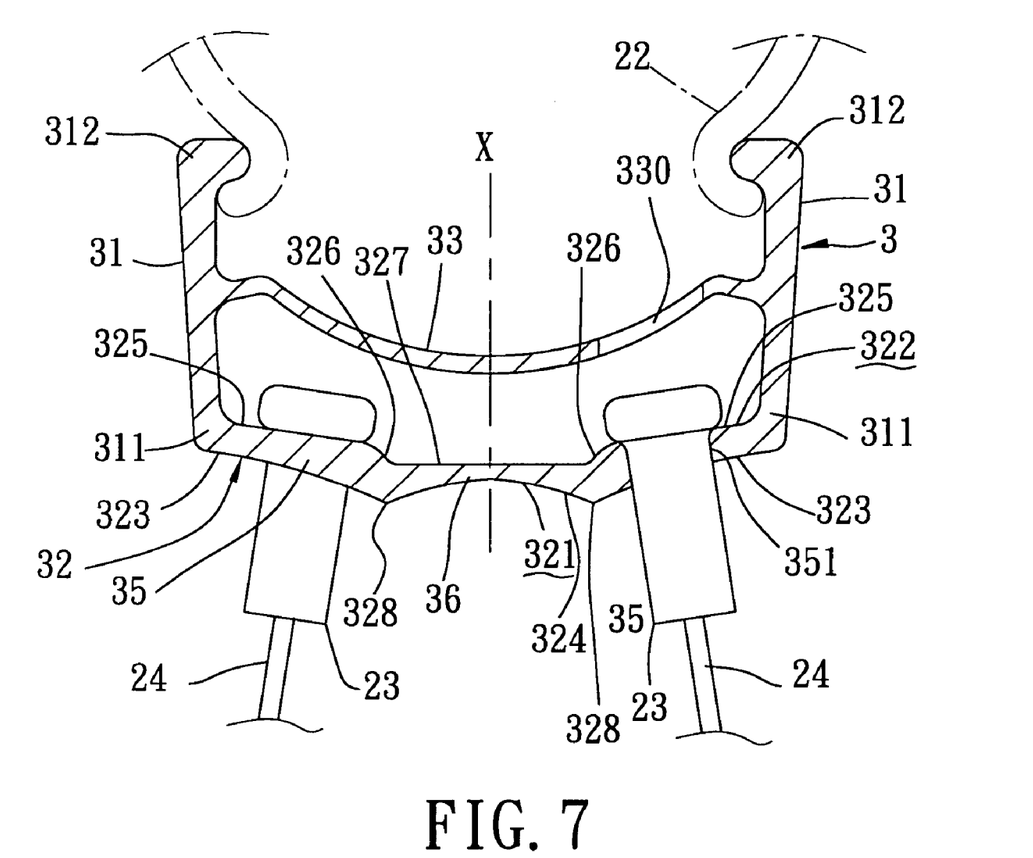
FIG. 7 is a sectional view of the third preferred embodiment of a wheel rim according to this invention.
Figure 8:
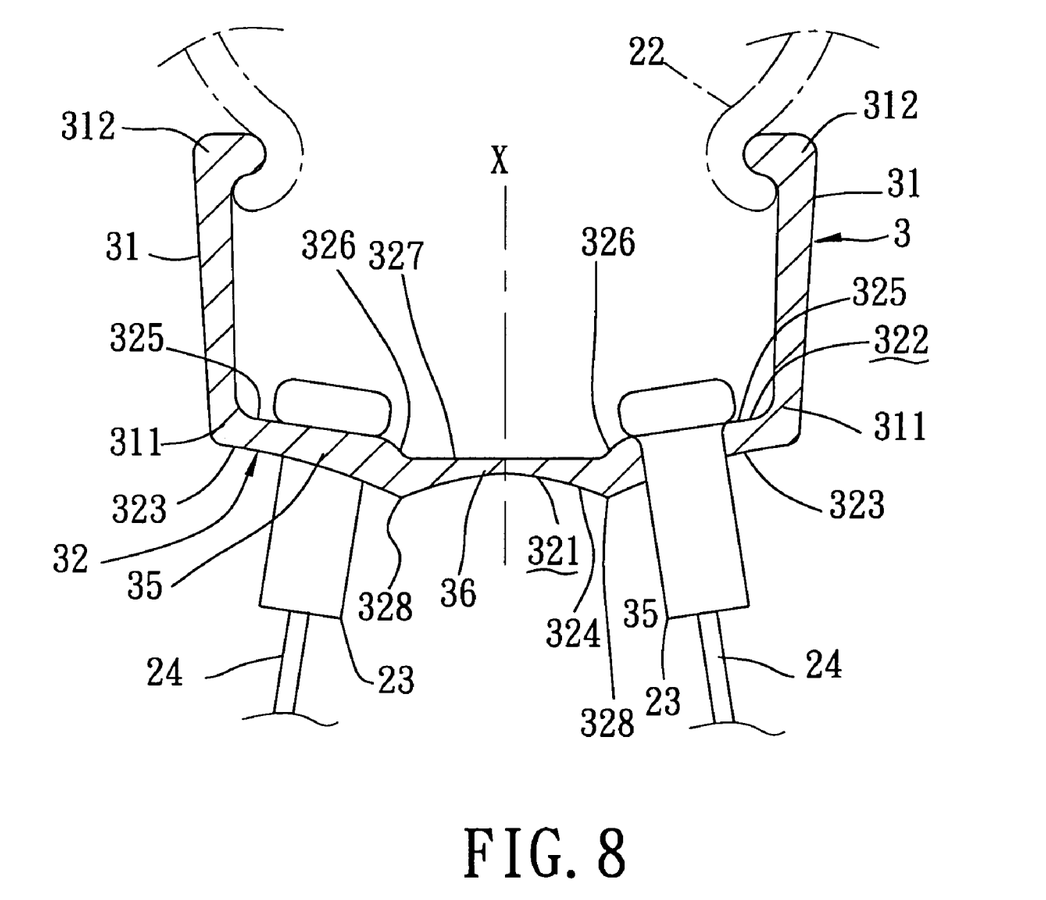
FIG. 8 is a sectional view of the fourth preferred embodiment of a wheel rim according to this invention.

The reinforcing wall 34 can be omitted, as shown in FIG. 7. Furthermore, the auxiliary connecting wall 33 can also be omitted, as shown in FIG. 8. The configuration of FIG. 8 allows for the wheel rim 3 to be connected with a tire 22 that has an inner tire body (not shown).

Some of advantages of this invention can be summarized as follows:

(1) Because the force-bearing areas 35 are thicker than the weight-reducing area 36, and are arched, the tensile strength of the wheel rim 3 is increased.

(2) The main connecting wall 32 is formed with the concaved surface portions 326 and the sharp ridges 328 that divide the main connecting wall 32 into three successive arched wall portions, thereby increasing the flexural strength and the torsional strength of the main connecting wall 32.

(3) The force-bearing areas 35 of the main connecting wall 32 are much thinner than the spoke-mounting seats 122 of the conventional wheel rim 12 appearing in FIG. 2, thereby resulting in a considerable decrease in the total weight of the wheel rim 3 of this invention.

(4) The reinforcing wall 34 interconnects middle portions of the main connecting wall 32 and the auxiliary connecting wall 33 so as to further strengthen the wheel rim 3.

1. With this invention thus explained, it is apparent that numerous modifications and variations can be made without departing from the scope and spirit of this invention. It is therefore intended that this invention be limited only as indicated by the appended claims.

I claim:

1. A wheel rim adapted to be connected to a hub by a plurality of locking heads and a plurality of spokes and adapted to permit a tire to be mounted thereon, said wheel rim comprising:

two annular sidewalls symmetrical relative to a radially extending middle plane, each of said sidewalls having a radial outer end adapted to be proximate to the tire, and a radial inner end adapted to be distal from the tire; and a main connecting wall adapted to be disposed around the hub and having two ends connected respectively and fixedly to said radial inner ends of said sidewalls, a radially inner surface adapted to face the hub and having two axial surface portions extending respectively from said sidewalls toward said radially extending middle plane, said axial surface portions having a concave shape in the direction of the tire, and a middle surface portion interconnecting said axial surface portions of said radially inner surface, said middle surface portion having a concave shape in the direction of the tire define a sharp ridge portion at a junction between said middle surface portion and each of said axial surface portions, and a radially outer surface opposite to said radially inner surface and adapted to face the tire, said radially outer surface having two axial surface portions extending respectively from said sidewalls toward said radially extending middle plane, two shoulder portions extending respectively from said axial surface portions of said radially outer surface toward said radially extending middle plane, wherein said shoulder portions are indented toward the hub, and a middle portion interconnecting said shoulder portions, said axial surface portions of said radially inner and outer surfaces defining two force-bearing areas that are formed with a plurality of mounting holes which are adapted to permit said locking heads to extend respectively therethrough, said middle surface portions of said radially inner and outer surfaces defining a weight-reducing area that is disposed between said force-bearing areas and that has a thickness smaller than a thickness of said force-bearing areas.

2. The wheel rim as claimed in claim 1, wherein the thickness of each of said force-bearing areas increases gradually in a direction toward said radially extending middle plane.

3. The wheel rim as claimed in claim 1, further comprising an auxiliary connecting wall that has two opposite sides that are connected respectively and fixedly to intermediate portions of said sidewalls.

4. The wheel rim as claimed in claim 3, further comprising an annular reinforcing wall that has a radial inner end connected fixedly to said main connecting wall, and a radial outer end connected fixedly to said auxiliary connecting wall.

5. The wheel rim as claimed in claim 1, wherein each of said mounting holes in one of said force-bearing areas of said main connecting wall is disposed between two adjacent ones of said mounting holes in the other one of said force-bearing areas of said main connecting wall along a circumferential direction of said wheel rim.

6. The wheel rim as claimed in claim 1, wherein said mounting holes in one of said force-bearing areas of said main connecting wall are aligned respectively with said mounting holes in the other one of said force-bearing areas of said main connecting wall.

7. A wheel rim adapted to be connected to a hub by a plurality of locking heads and a plurality of spokes and adapted to permit a tire to be mounted thereon, said wheel rim comprising:
two annular sidewalls symmetrical relative to a radially extending middle plane, each of said sidewalls having a radial outer end adapted to be proximate to the tire, and a radial inner end adapted to be distal from the tire; and
a main connecting wall adapted to be disposed around the hub and having
two ends connected respectively and fixedly to said radial inner ends of said sidewalls,
a radially inner surface adapted to face the hub and having two axial surface portions extending respectively from said sidewalls toward said radially extending middle plane, and a middle surface portion interconnecting said axial surface portions of said radially inner surface, and
a radially outer surface opposite to said radially inner surface and adapted to face the tire, said radially outer surface having two axial surface portions extending respectively from said sidewalls toward said radially extending middle plane, two shoulder portions extending respectively from said axial surface portions of said radially outer surface toward said radially extending middle plane, wherein said shoulder portions are indented toward the hub, and a middle portion interconnecting said shoulder portions, said axial surface portions of said radially inner and outer surfaces defining two force-bearing areas that are formed with a plurality of mounting holes which are adapted to permit said locking heads to extend respectively therethrough, said middle surface portions of said radially inner and outer surfaces defining a weight-reducing area that is disposed between said force-bearing areas and that has a thickness smaller than a thickness of said force-bearing areas, the thickness of each of said force-bearing areas increasing gradually in a direction toward said radially extending middle plane.

8. The wheel rim as claimed in claim 7, wherein said middle surface portion of said radially inner surface of said main connecting wall has a concave shape in the direction of the tire so as to form a sharp ridge at a junction between said middle surface portion of said radially inner surface of said main connecting wall and each of said axial surface portions of said radially inner surface of said main connecting wall.

* * * * *